Oct. 4, 1966  E. D. PHILLIPS  3,276,825
SEALING BEARING UNIT
Filed Feb. 16, 1965  2 Sheets-Sheet 1
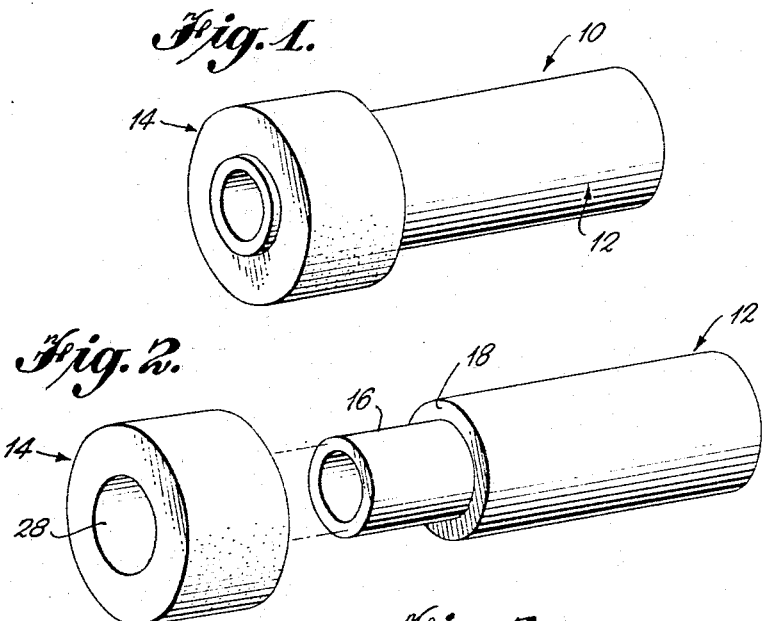
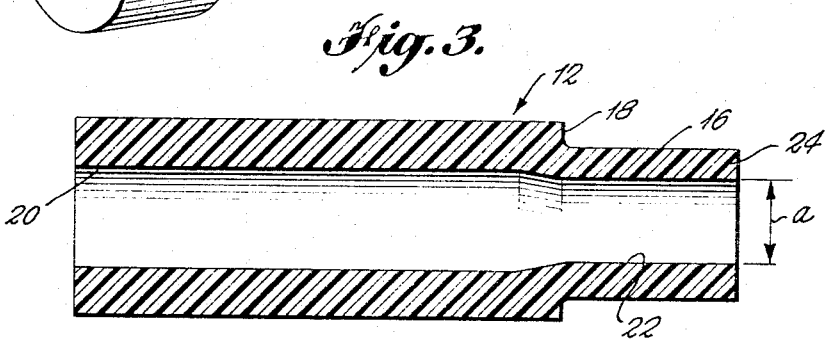
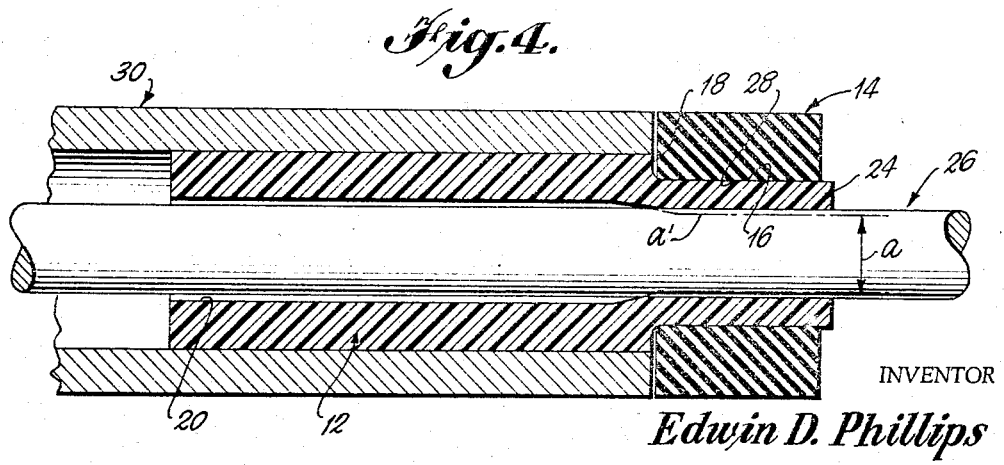
INVENTOR
*Edwin D. Phillips*
BY *Shoemaker and Mattare*
ATTORNEYS Oct. 4, 1966 E. D. PHILLIPS 3,276,825
SEALING BEARING UNIT
Filed Feb. 16, 1965 2 Sheets-Sheet 2
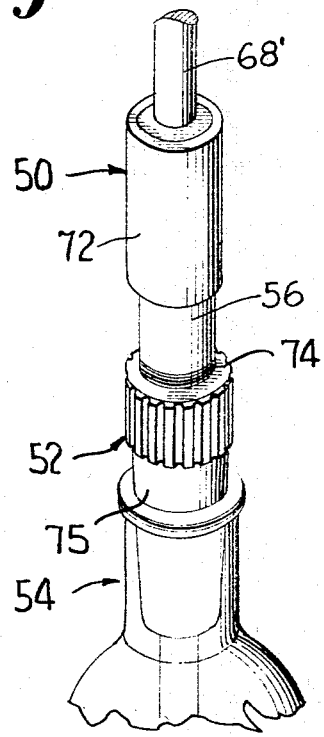
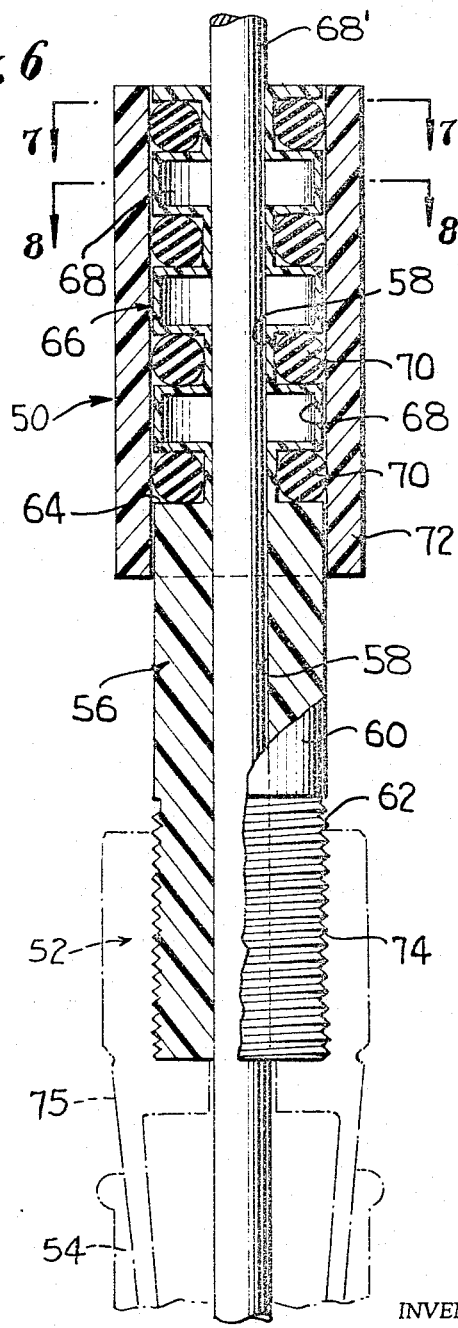
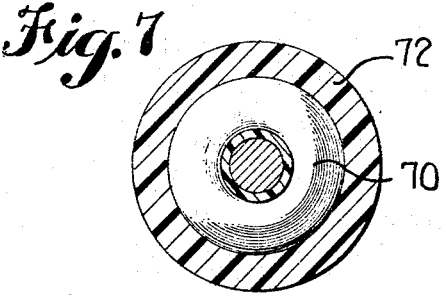
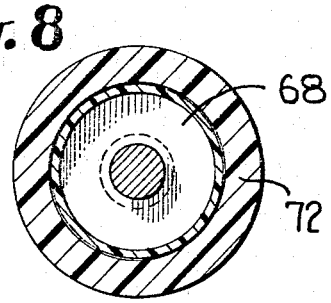
INVENTOR
Edwin D. Phillips
BY Shoemaker and Mattare
ATTORNEYS United States Patent Office 3,276,825
Patented Oct. 4, 1966

3,276,825
SEALING BEARING UNIT
Edwin D. Phillips, 170 Albert St., North Plainfield, N.J.
Filed Feb. 16, 1965, Ser. No. 435,404
4 Claims. (Cl. 308—36.1)

This application is a continuation-in-part of my application Serial No. 94,256, filed March 8, 1961, for Sealing Bearing Unit.

This invention relates to the class of bearings, more particularly a bearing for supporting a rotary or reciprocating shaft.

In many industrial plants and particularly in laboratories, operations are carried out involving the use of rotary shafts or reciprocating shafts, wherein it is highly important that a very tight seal be maintained between the shaft and a supporting bushing or bearing. Use is commonly made of seals which comprise annular bodies encircling a shaft with means for compacting the bodies against the shaft so as to form the desired seal but such sealing means necessitates frequent adjustment to take up wear. In addition, such sealing means are not qualified to function also as supporting bearings in addition to their function as a seal.

It is a particular object of the present invention to provide a new combined bearing and seal wherein both the functions of providing a suitable bearing support for a shaft and also for providing a means for sealing the shaft in a housing or the like for the prevention of the passage of liquids or gases, are accomplished.

Another object of the invention is to provide a new and novel sealing bearing constructed in such manner that the desired tight engagement between the sealing bearing and a shaft passing therethrough is maintained at all times without requiring tension for making adjustments to compensate for wear.

Still another object of the invention is to provide a new and novel combined seal and bearing, which requires no periodic lubrication but wherein the material of the bearing unit itself is of a character to provide constant substantially friction free engagement with an encircled reciprocating or rotating shaft.

A further and more specific object of the invention is to provide, for a shaft, a combined seal and bearing which is of extreme simplicity and which is adapted for easy cleaning and easy application to and removal from a shaft and which provides, in one embodiment, two cooperating members for accomplishment of the desired functions.

The invention broadly contemplates the provision, in one embodiment, of an elongate body having a longitudinal bore therethrough for receiving a shaft. The body may function as a combined supporting means for maintaining a shaft in position in a housing and a sealing means which through constant frictional engagement with a shaft passing therethrough functions to prevent the passage of fluid or gases around the shaft either into or out of the housing in which it is located. The bearing body is formed of an elastomer, more specifically the synthetic Teflon and the desired sealing action is obtained by forming the bore through the body of reduced diameter through a portion of its length so as to effect a tight engagement with a shaft passing therethrough. This tight engagement with the shaft is maintained constantly and any wear occurring is taken up by a constricting member encircling the body in the area of reduced bore diameter, such constricting body preferably being in the form of a heavy elastic bushing or ring or other means which is capable of constantly applying a strong constricting force to and around the body.

In another embodiment of the invention there is provided a sleeve of a synthetic resin plastic such as tetrafluoroethylene resin, known commercially as Teflon for receiving a shaft such as a polished glass shaft or a stainless steel shaft and formed in part to provide annular lubricant containing pockets alternating with annular grooves opening outwardly with respect to the shaft enclosing part of the bearing and having tensioning rings therein of a suitable elastomer whereby a tight seal will be constantly maintained around a shaft and a lubricant will be constantly supplied to the shaft which may be of a reciprocating or a rotating type.

The invention will be best understood from a consideration of the following detailed description taken in connection with the accompanying drawings forming a part of this specification with the understanding, however, that the invention is not confined to a strict conformity with the showing of the drawings but may be changed or modified so long as such changes or modifications mark no material departure from the salient features of the invention as defined by the appended claims.

In the drawings:

FIG. 1 is a view in perspective of a combined seal and bearing constructed in accordance with one embodiment of the present invention.

FIG. 2 is an exploded view of the structure of FIG. 1, showing the elastomer constricting member removed from the reduced end portion of the elastomer body.

FIG. 3 is a longitudinal sectional view through the elastomer body.

FIG. 4 is a view illustrating the application of the sealing bearing of FIGS. 1 to 4, showing the same within the housing and having a shaft extending through the bearing.

FIG. 5 is a view in perspective of another embodiment of the invention showing the same coupled with a bottle or flask stopper of a synthetic resin material.

FIG. 6 is a longitudinal sectional view taken approximately on the line 6—6 of FIGURE 5 through the bearing and seal unit only, the stopper and a portion of a flask neck being indicated in broken lines.

FIG. 7 is a transverse section taken substantially on the line 7—7 of FIG. 6.

FIG. 8 is a transverse section taken substantially on the line 8—8 of FIG. 6.

Referring now more particularly to the drawings, the numeral 10 generally designates a sealing bearing unit constructed in accordance with one embodiment of the invention.

The unit 10 comprises the elongate body 12 and a constricting element 14 which is applied to the body and which functions in the manner hereinafter set forth.

The body 12 is here illustrated as being of cylindrical form. However, it is to be understood that it does not necessarily have to be externally circular as shown in order to serve the objects of the invention.

The body 12 is formed throughout of a suitable elastomer which in inert to or uneffected by most chemicals of a liquid or gaseous nature. Such elastomer is preferably the synthetic resin tetrafluoroethylene, known as Teflon. However, while Teflon is a preferred material, it is to be understood that the invention is not necessarily limited to the use of such material. An advantage which Teflon has over many of the other elastomers is that it has a self-lubricating quality and therefore a shaft rotating in contact therewith will operate with a minimum of friction and without the necessity of employing any type of lubricant.

The body 12 has a portion thereof, here shown as being at one end of the body, of reduced outside diameter, such portion of reduced outside diameter being designated 16. Thus, there is formed at one end of the body the terminal reduced portion and a shoulder 18 at the inner end of the reduced portion. Such reduced portion is exteriorly cirular as shown.

Extending axially through the body 12 is a passage or bore 20. This bore is formed in the area of the portion 16 of slightly reduced diameter. Such reduced bore diameter is designated 22. Thus in the reduced bore diameter section it will be seen that the wall portion in the area 24 is materially thinner than the remainder of the body and this thinned down or reduced wall thickness facilitates the constriction of the body in this area or portion when a suitable encircling constrictor body such as the body 14 is expanded and applied to the portion 24 so that upon contraction it will impose a constant constricting pressure on this portion of the body.

The reduced diameter portion 22 of the body is proportioned to tightly or snugly engage around a shaft extending through the bearing as shown in FIG. 4. In this figure a shaft 26 is illustrated which initially is of a diameter slightly larger than the portion 22 of the bearing so that when the shaft is extended into or through the bearing it will be tightly engaged against the wall of the portion 22 and will expand this portion slightly. The double pointed arrow $a$ designates the initial diameter of the reduced diameter portion 22 and it will be seen upon reference to FIG. 4 that the shaft 26 has expanded the diameter of the portion 22, the broken line $a'$ indicating the surface of the reduced diameter portion prior to the insertion of the shaft therethrough.

The constrictor body 14 is here illustrated as being in the form of a heavy thick walled collar or annulus which is preferably formed of soft or resilient rubber. This constricting collar or annulus may have a length approximating the length of the reduced portion 16 of the bearing and is here shown as having a materially greater wall thickness. However, the greater wall thickness does not necessarily have to be a critical or essential feature as the main essential of the body 14 is that it be of a soft elastic nature or of a suitable nature otherwise to impose a strong constricting pressure upon and around the end portion 24 of the bearing body. Accordingly, it is to be understood that the body or member 14 when formed of an elastomer, such as rubber, will have the bore or passage 28 initially of a diameter materially less than the outside diameter of the portion 24. Thus it will be necessary that the body 14 be expanded so as to apply it around the end 24 in the reduced exterior diameter part thereof so that when the tension of the expanded body is released it will grip the portion 24 with sufficient pressure to compress the same tightly against a shaft extending therethrough. Consequently a tight seal will be maintained between the shaft and the bearing and since the constrictor body or member 14 is under constant tension any small amount of wear occurring in the inner surface of the reduced inside diameter portion 22 will be taken up or be compensated by the constricting action of the body 14.

In FIG. 4, the bearing body has been shown installed in a shaft housing or container 30, with the externally reduced end portion of the bearing body projecting beyond the end of the housing so as to receive the constricting body 14 in the manner illustrated. The shoulder 18 of the bearing body is shown as being flush with the end of the housing 30 so that the end of the housing coacts with the shoulder to form a suitable stop or abutment for the inner end of the constricting body 14.

While an elastic body or a body of elastomer in the form of a wide thick band, is preferred for the constrictor member 14, it is within the purview of the present invention to employ a constricting body of a suitable material which would not be affected by chemicals in association with which the bearing may be used.

FIGURES 5 to 7 illustrate another embodiment of the invention. In these figures the second embodiment of the bearing and seal structure is generally designated 50 and is illustrated in FIGURE 5 particularly, connected with a tapered fluorocarbon resin stopper 52 designed for insertion into the neck of a bottle or flask 54.

The bearing and seal unit 50 comprises the elongate body 56 having an axial bore 58 therethrough. One end portion of the body 56 is solid from the wall of the bore 58 to the outer surface of the body as indicated at 60 and the lower end of this solid portion, by which is meant the portion of the body lying outside the bore 58, is screw threaded as indicated at 62.

The so-called solid portion 60 of the body may be defined as the lower end of the body. Accordingly the upper end of the body is shown as formed with a series of external annular grooves 64, such upper end portion of the body being generally designated 66 and the grooves 64 opening radially outwardly as shown.

Alternating with the grooves 64 are the internal annular channels 68 which open only toward the bore 58.

The bore 58 throughout the entire length of the body 56 is designed to have extended therethrough a shaft 68' which for laboratory work may be of polished glass or of stainless steel and the overall diameter of the shaft 68' relative to the diameter of the bore 58 is such that the shaft is tightly engaged in or gripped by the body or by the inner surface of the bore.

By using the fluoro carbon resin described and providing the bore 58 of a diameter slightly less than the outside diameter of the shaft, such resin will yield to permit the shaft to be forced therethrough and consequently a tight seal will be thus formed.

The channels 68 are formed to provide lubricant reservoirs and the group of such channels 68 is interposed between terminal grooves 64 in which are located the annular elastomer rings or O rings 70 and the area longitudinally of the body 56 within which the grooves and channels lie, is enclosed in a container or sleeve 72 into which the body is tightly inserted so that this container, which may be formed of a suitable metal or of heavy rubber, will impose additional constricting tension upon the body in which the grooves and channels are formed and upon the O rings 70.

As illustrated, the walls of the grooves and channels are relatively thin as compared with the thickness of the solid part of the body between the bore 58 and the outer side of the body and consequently the inner walls of the grooves 64 which bear against the shaft 68' will be readily compressed by the elastic rings 70 to maintain a tight bearing engagement against the surface of the shaft 68' at opposite sides, in the longitudinal direction of the shaft, of the lubricant containing channels.

The threaded end portion of the body 56 is provided for engagement in a socket or recess 74 in the head of the stopper 52 as that shown in FIG. 5, such recess in the stopper head being internally threaded, as will be obvious, to receive the end of the body 56 and the lower end portion of the stopper, designated 75, is tapered to fit into the tapered neck or mouth portion of the neck of a flask such as is commonly used in a laboratory and which in FIG. 5 is generally designated 54.

While the bearing and seal structure has been illustrated and described for connection with, and in connection with, a stopper or other piece of laboratory equipment, it will be readily apparent that the essential feature of the bearing and seal structure resides in the grooved and channeled portion of the body 56 and the bearing body may be mounted or supported either vertically or horizontally for use either with a reciprocating shaft or a rotating shaft.

While the particular type of synethetic resin plastic referred to is well known as having certain lubricating qualities, the lubricating action of the resin may be enhanced by the incorporation therein, or being impregnated with, about 15% of graphite, particularly in the solid portion 56.

It will be seen from the foregoing that the present invention provides in the disclosed embodiments thereof, a new and novel type of sealing bearing which is of particular value in those situations where protection of materials from contamination must be provided since the bearing not only functions as an efficient bearing but also as a sealing valve element. Accordingly, the invention is particularly well adapted for use in pharmaceutical laboratories or in connection with food industry machinery and the like.

Another important advantage of the present invention resides in the fact that its simplicity facilitates ready and thorough cleaning.

I claim:

1. A bearing and seal for a shaft, comprising an elongate body of a fluorocarbon resin, the body having an axial bore therethrough to receive a shaft, said body in an end portion thereof being formed with alternating grooves and channels, said grooves opening radially outwardly and said channels opening radially inwardly into said axial bore, said channels being adapted to contain a lubricant, a constructing resilient annular member encircling the body in each of said grooves for compressing and constricting portions of the material of the body lying between said channels against a shaft extending through the bore, means encasing the body in the portion thereof having said grooves and channels therein, and that remaining portion of the body lying between said grooves and channels and the end of the body remote therefrom being solid between the bore and the outer side of the body.

2. The invention according to claim 1, wherein the said body encasing means comprises a relatively rigid cylindrical member tightly enclosing the body and compressing said annular members.

3. The invention according to claim 1, wherein said grooves and said channels are respectively defined by inner, outer and side wall portions of the resin material forming the body and having a substantially constant thickness and being relatively thin as compared to the thickness of the said portion of the body lying between the bore and the outer side of the body.

4. The invention according to claim 1, wherein a terminal portion of the body remote from the said grooves and channels is externally screw threaded.

References Cited by the Examiner

UNITED STATES PATENTS

| | | | |
|---|---|---|---|
| 759,659 | 5/1904 | Braungart | 277—68 X |
| 2,746,781 | 5/1956 | Jones | 277—165 X |
| 2,831,714 | 4/1958 | Thorburn | 277—112 |
| 2,973,997 | 3/1961 | Kirkland | 308—36.2 |
| 2,981,573 | 4/1961 | Reuter | 308—36.1 |
| 3,038,347 | 6/1962 | Sloan et al. | 277—212 X |
| 3,057,630 | 10/1962 | Sneed | 277—165 |

SAMUEL ROTHBERG, *Primary Examiner.*

LAVERNE D. GEIGER, *Examiner.*